No. 692,236. Patented Feb. 4, 1902.
E. CANTONO.
ELECTROMECHANICAL DEVICE FOR ELECTRIC TRACTION.
(Application filed Aug. 2, 1899.)
(No Model.)
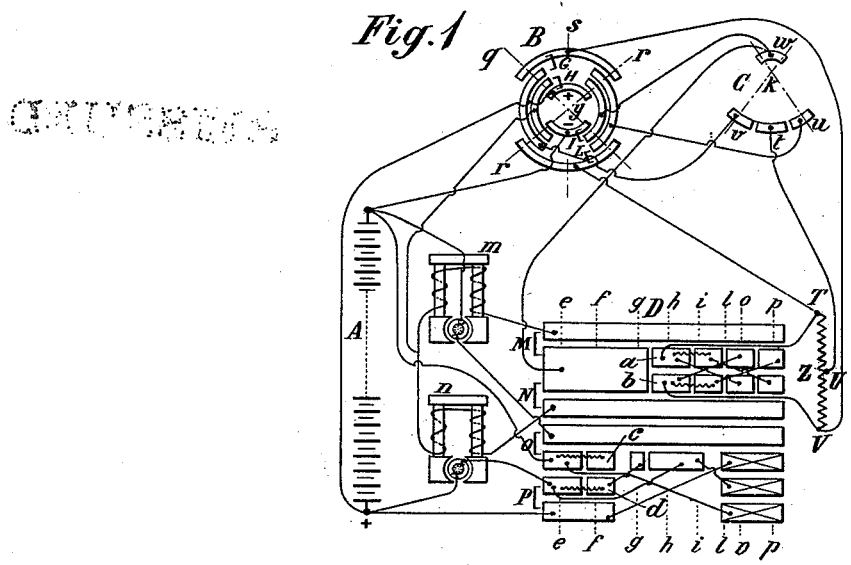
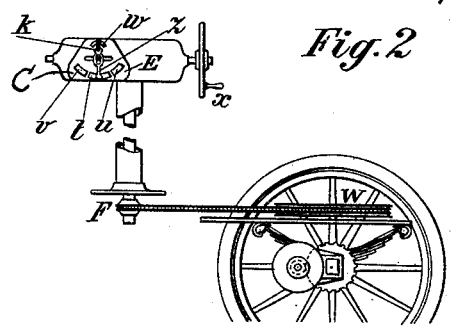
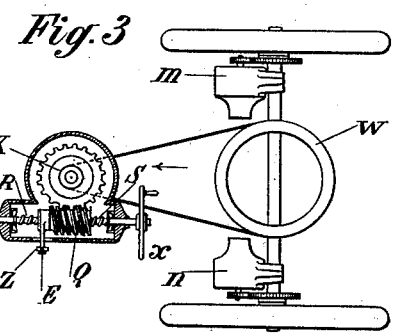
Witnesses:
Inventor
Eugenio Cantono
By Wm E. Boulter,
Attorney

UNITED STATES PATENT OFFICE.

EUGENIO CANTONO, OF ROME, ITALY.

ELECTROMECHANICAL DEVICE FOR ELECTRIC TRACTION.

SPECIFICATION forming part of Letters Patent No. 692,236, dated February 4, 1902.

Application filed August 2, 1899. Serial No. 725,897. (No model.)

*To all whom it may concern:*

Be it known that I, EUGENIO CANTONO, captain of engineers in the Italian army, a subject of the King of Italy, residing at Rome, in the Kingdom of Italy, have invented certain Improvements in Electromechanical Devices for Electric Traction, (for which I have obtained Letters Patent in the Kingdom of Italy, dated April 13, 1899, Reg. Att. Vol. 109, No. 55,) of which the following is a clear and complete specification.

The present invention relates to improvements in electric motor-cars, and particularly the driving and steering devices thereof, and the invention embodies electromechanical switch devices which reduce the effort of steering on the part of the operator to a minimum in light motor-cars and in heavy ones facilitate it immensely.

The invention consists in the novel construction, arrangement, and combination of parts, as hereinafter fully described, illustrated in the drawings, and pointed out in the appended claim.

In the drawings, Figure 1 is a general diagrammatic view illustrating my invention. Fig. 2 is a side view, partly broken away, of part of a vehicle, showing part of my invention combined therewith. Fig. 3 is a sectional plan view of the parts seen in Fig. 2.

The accumulators are connected with electric motors through the reversing-switch $s$ for driving the car located on the axle of the front part or steering-wheels. The arrangement also comprises current-reversers for starting the motor, for regulating speed, for reversing the direction of the car, and for electric control, and, finally, of mechanical devices which enable the electric control to be effected automatically at the same time as the mechanical control and consist of a hand-wheel $x$, by means of which a worm $Q$ is actuated, which transmits its movement to a spirally-toothed wheel $X$, on the shaft of which is keyed a driving-wheel $F$, which transmits the power of steering by means of a chain to the turning-plate or steering-wheel $W$, fixed on the front axle. This worm moving along the shaft of the wheel has a pin $E$, which as soon as the driver steers the car mechanically automatically operates the lever of the switch $C$ for the electric control. The movement of the worm along the shaft of the wheel is limited on both sides by strong springs $R$ and $S$. The switch for electrically controlling the car when driving straight interpolates a resistance half into the field-circuit of the motor $m$ and half into that of the motor $n$. If, for instance, it is wished to steer to the right, the resistance is entirely inserted in the left-hand motor $n$, which then, as its magnetic field is reduced, runs faster. If, on the other hand, it is wished to steer to the left, then the resistance is interpolated in the right motor $m$, when a contrary effect is of course obtained.

In the diagram of the circuit, Fig. 1, A denotes the accumulators; $m$ and $n$, the electric motors; B, the switch for reversing the direction of the vehicle; C, the automatic switch for steering, and D the switch for starting and regulating the speed of travel.

The bridges M N O P of the switch D, which are connected mechanically with each other, but insulated electrically, can take the following positions: In position $e$ $e$ the motors are excited and the brushes short-circuited, so that there is a strong electric braking action. In position $f f$ the motors are still excited and the brushes are in short circuit to the resistances $c$ for the motor $m$ and $d$ for the motor $n$. The braking action is therefore weak. $g\,g$ is the starting position of the car, the two armatures are in series on the battery A, and the excitation is complete. In position $h\,h$ the armatures are in series and the exciting-current passes through the resistance $z$, intended for the steering, the method of operation of which will be further described below. In position $i\,i$ the motors are as in the preceding position $h\,h$. The exciting-current passes in this case also through the resistance $z$, and the resistances $a\,b$ are inserted in the field-circuits of the motors. $l\,l$ is the position of the motors when they pass from the series connection to the parallel. In position $p\,p$ the motors are likewise in parallel, and the resistances $a\,b$ are inserted in the field-circuits.

The four bridges G H I L of the switch B, electrically insulated and connected with each other by means of a lever pivoted at $y$, have three positions—viz., $s$, the position of the interruption of the excitation of the motors; $q$, the position in which the excitation operates the forward travel, and $r$ the position in which the current of the field of the motors—that is, the polarity thereof—is reversed, when the car can travel backward.

The switch C is intended to operate the electric control of the car by means of the resistance Z. It acts in connection with the switch D and works for the traveling forward as well as backward of the car and operates in the positions $h\ h\ i\ i\ l\ l\ o\ o\ p\ p$ of the bridges M N O P of the switch D. Assuming that the bridges M N O P of the switch D stand in the position $h\ h$ and the bridges G H I L of the switch B in the position $q\ q$ for traveling forward, a lever pivoted at $k$ and operated automatically, as will be seen hereinafter, is arranged so that it can connect the block $w$ with the block $t$ or $u$ or $v$. If now the block $w$ is connected with the block $t$, the negative pole of the battery becomes connected, by means of the bridge I, with the block $w$, and the current consequently passes to the block $t$ and to the center of the resistance Z. In the point U, therefore, the resistance Z is inserted half in the electromagnetic field of the motor $m$ and half in that of the motor $n$. Thus is obtained forward motion in a straight line.

Case 1. $w$ is put in connection with $u$. Current passes then from $u$ to the switch B and by means of the bridge L to the point T of the resistance Z. Thus the whole of resistance Z is interpolated in the circuit of the motor $n$, while current passes direct into that of the motor $m$. Consequently the motor $m$ will run slower and the motor $n$ will run faster, or, in other words, the car will turn to the right. (See the arrangement of the motors in Fig. 3, where the arrow shows the direction of the forward travel.)

Case 2. $w$ is connected with $v$, so that current passes from $w$ to $v$ by means of the bridge G to the point V of the resistance Z. Thus in this case the resistance Z is entirely inserted in the field-circuit of the motor $m$, which consequently runs faster, while the motor $n$ runs slower. The car consequently in this case turns to the left. Assuming now that the bridges of the switch D are, as described above, in the position $h\ h$ and those of the switch B in the position $r\ r$ for traveling backward, the following will ensue: First, $w$ is connected with $t$ and after this the positive pole of the battery with the point U of the steering resistance Z, so that half of the latter is switched in the field-circuit of the motor $m$ and the other half in that of the motor $n$. In this manner backward travel in a straight line is obtained. If now $w$ is connected with $u$, current passes from $w$ to $u$ and from $u$ by means of the bridges G to the point V of the resistance Z. In this manner the whole of this resistance is inserted in the electromagnetic field of the motor $m$ and current passes direct to the field-circuit of the motor $n$, so that $m$ runs faster and $n$ runs slower, in consequence of which in backward travel the car will turn to the right in the direction of travel and therefore to the left from the driver if he stands facing forward. Finally, if $w$ is connected with $v$ current passes from $v$ by means of the bridge L to the point T of the resistance Z, so that the whole resistance is inserted in the motor $n$, in consequence of which the car will turn to the right from the driver.

It is obvious that the alterations of direction described above also occur in the other positions of the switch D—viz., $i\ i\ l\ l\ o\ o\ p\ p$—which are intended to effect alterations in the speed of travel and in the exertion of traction power simultaneously in both motors.

With regard to the mechanical steering apparatus (illustrated in Figs. 2 and 3) its operation is as follows: If the wheel $x$ is turned, (by hand,) the worm Q revolves and transmits its movement to the spur-wheel X, on whose shaft is the driving-wheel F, which by means of a chain communicates the power for steering to the turning-plate or steering-wheel W. The worm Q can slip along the shaft of the wheel $x$ and is stopped at either end by the two springs R and S. If now the car is traveling forward in a straight line and it is wished to steer it to the left, the wheel $x$ is turned in the opposite direction to the hands of a clock. The worm Q does not immediately set in revolution the spur-wheel X, but is moved to the right and compresses the spring S until the counteraction thereof is strong enough to overcome the resistance to the steering. In its displacement the worm Q of course takes along with it the pin E, which brings the lever $z$ of the steering-switch G from the center block $t$ to the block $u$, whereby, as explained above, (Case 1,) the electric motors coöperate for steering to the right. If, on the other hand, the car is to be steered to the left, the spring R is compressed by turning the hand-wheel $x$ in the direction of the hands of a clock, and the lever $z$ is brought to the plate $v$, so that, as explained above, (Case 2,) the electric motors coöperate for steering to the left, whereby the exertion of steering on the part of the driver is reduced to a minimum.

What I claim is—

The combination with the motors, of a steering-switch comprising contact-blocks and a lever adapted to be brought into contact with said blocks, a resistance adapted to be brought into the magnetic field of the motors or either of them to vary their speed according as the lever is brought in contact with the different blocks as described, means for mechanically actuating the lever comprising a hand-wheel, a worm actuated thereby, a spirally-toothed wheel meshing with the worm, a driving-wheel on the shaft of the spirally-toothed wheel, a steering-wheel mounted on the axle of the vehicle, a chain gearing the steering-wheel and driving-wheel together, a pin on the worm adapted to actuate the lever of the steering-switch, and connections between the steering mechanism and the motors and adapted to be actuated by the latter as set forth.

In witness whereof I have hereunto set my signature in the presence of two witnesses.

EUGENIO CANTONO.

Witnesses:
R. V. CHASE,
J. WEILER.